*INVENTOR.*
Royal H. Benson
BY C. James Bushman

AGENT

United States Patent Office 3,623,840
Patented Nov. 30, 1971

---

3,623,840
ANALYTICAL METHOD AND APPARATUS FOR ANALYSIS OF LABILE HYDROGEN CONTAINING COMPOUNDS
Royal H. Benson, Texas City, Tex., assignor to Monsanto Company, St. Louis, Mo.
Continuation-in-part of application Ser. No. 479,109, Aug. 12, 1965. This application Jan. 2, 1969, Ser. No. 788,432
Int. Cl. G01m 23/12; G21h 5/00
U.S. Cl. 23—230 R          26 Claims

ABSTRACT OF THE DISCLOSURE

A method for analyzing for labile hydrogen in hydrogen-containing compounds in mixtures by passing the mixture over a tritium-containing substrate to effect exchange of said labile hydrogen with said tritium, detecting and measuring the radioactivity of the resulting tritium-containing compounds and using the radioactive measurement to determine the amount of the labile-hydro-containing compound in the mixture and an exchange column and system therefor.

BACKGROUND OF THE INVENTION

This is a continuation-in-part of copending application Ser. No. 479,109 filed Aug. 12, 1965, now U.S. Pat. No. 3,560,158.

The present invention relates to an analytical method and apparatus. More particularly, the present invention relates to an analytical method and apparatus whereby very small amounts of certain components of mixtures may be accurately detected and measured.

One of the most useful present day analytical techniques is gas chromatography. All chromatographic methods involve distribution of the material to be separated between two phases which move countercurrent with respect to each other. Generally, one phase is a fixed phase while the other is a mobile phase. The fixed phase may be liquid or solid and the mobile phase gas or liquid. Gas chromatography, as the name implies, employs a gaseous mobile phase.

An inert carrier gas such as hydrogen, nitrogen, helium, etc., is used to transport the mixture to be separated through a column containing the fixed phase. Both solid and liquid fixed phases are used in gas chromatography. The fixed phase in this technique usually comprises a selective absorbent or a selective adsorbent and in some instances a combination of the two. In resolving a mixture into its components by gas chromatographic techniques, the mixture is vaporized, usually admixed with a carrier gas and passed through a long cylindrical column packed with the fixed phase of selective adsorbent and/or selective absorbent. On contacting the fixed phase, the mixture is resolved into its components which are distributed along the length of the fixed phase according to their affinity for the fixed phase, those having the greater affinity being distributed at the entry end of the column with those of decreasing affinity being distributed farther down the column. The continuous passing of the carrier gas over the fixed phase results in the components being eluted one after another from the column in the order of their distribution through the column. As each component is eluted from the column, it is detected and measured, such as by continuously measuring the thermal conductivity of the effluent from the column.

Though the present chromatographic analysis techniques such as that above described are adequate for most purposes, they are not always adequate when the detection and measurement of very small amounts of components of mixtures is desired. Also, in many instances, present chromatographic techniques are often unable to resolve all components of a mixture and two components may appear as one in the final analysis of the mixture.

SUMMARY OF THE INVENTION

It is an object of the present invention to provide a new and improved analytical method. Another object of the present invention is to provide a new and improved analytical method whereby certain components present in mixtures in very small amounts may be quantitatively detected and measured. It is also an object of the present invention to provide a new and improved analytical method whereby certain components present in mixtures may be more accurately detected and measured. Still another object of the present invention is to provide a fluid-solid tritium exchange column for use with the above methods and an analysis system utilizing said column. Additional objects will become apparent from the following description of the invention herein described.

The present invention which fulfills these and other objects comprises an analytical method whereby compounds containing labile hydrogen or compounds or elements which are convertible to compounds containing labile hydrogen can be detected and measured with substantial accuracy when present in mixtures even in extremely low concentrations. In one of its embodiments, the present invention is an analytical method for the detection and measurement of labile-hydrogen-containing compounds which comprises passing a sample mixture containing at least one compound having labile hydrogen over a labile-tritium-containing substrate whereby the labile hydrogen in said compound exchanges with the labile tritium in said substrate; detecting and measuring the radioactivity of the resulting tritium-containing compound, said detection and measurement being directly referable to said labile-hydrogen-containing compound initially present in said sample mixture.

In another embodiment, the present invention is an analytical method for the detection and measurement of components convertible to labile-hydrogen-containing compounds which comprises subjecting a sample mixture containing at least one component convertible to a labile-hydrogen-containing compound to a suitable conversion means; exchanging the labile hydrogen of the resulting labile-hydrogen-containing compound with tritium; and detecting and measuring the radioactivity of the resulting tritium-containing compound, which detection and measurement is directly referable to said component initially present in said mixture convertible to said labile-hydrogen-containing compound.

In still another embodiment of the present invention, the present analytical technique comprises first resolving a mixture containing labile-hydrogen-containing compounds and/or components convertible to labile-hydrogen-containing compounds into its components and then detecting and measuring these components as described in reference to the above embodiments of the present invention.

A still further embodiment of the present invention comprises a fluid-solid column for use in the detection and measurement of labile-hydrogen-containing compounds and compounds convertible thereto comprising a suitable tube packed with fibers of a substrate having labile hydrogen atoms at least a portion of said hydrogen atoms having been replaced by tritium atoms.

The present invention represents a very substantial improvement in the analysis of mixtures. The present analytical technique provides for detection of quantities of materials beyond the lower limits of present chromatographic means. Further, the present analytical technique provides for greater accuracy in the quantitative measurement of certain components of mixtures particularly when such components are present in extremely small quantities. Also, components not resolvable one from another by ordinary chromatographic techniques may be effectively resolved and measured when one of the components is one having labile hydrogen atoms or one which is convertible to such a compound and the other is not.

In addition to the aforementioned advantages resulting from the present invention, it should be noted that the analytical technique disclosed herein provides an advantageous means of preparing tritium-containing compounds. Tritiated compounds are quite useful as radioactive tracers for leak determination in pipelines and other enclosed vessels as well as in other applications. When labile-hydrogen-containing compounds are passed over the fixed bed of tritium-containing substrate as described below, tritiated compounds are readily formed with good conversion and yields.

BRIEF DESCRIPTION OF THE DRAWINGS

The present invention is further described by reference to the accompanying drawings.

Figure 1:
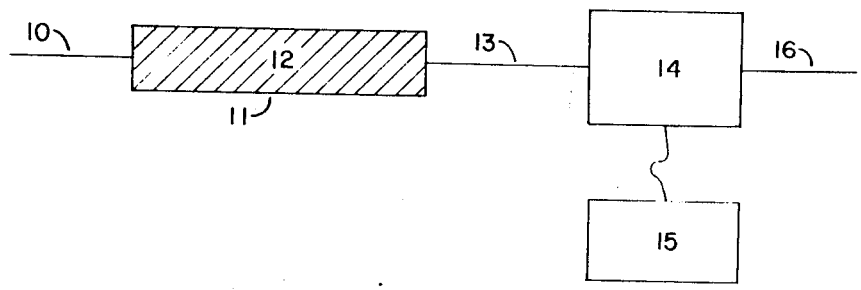
FIGS. 1, 2 and 3 represent schematic flow diagrams of different embodiments of the present invention.

Referring first to FIG. 1, a mixture containing at least one compound having labile-hydrogen atoms is passed either in the liquid or gaseous phase, though preferably in the gaseous phase, by means of line 10 into exchange column 11 which is packed with a fixed phase 12, hereinafter referred to as substrate. This substrate 12 is one containing exchangeable tritium. As the mixture passes through column 11 and over substrate 12, the compounds in the mixture which contain labile hydrogen exchange their labile hydrogen for the tritium of substrate 12 until an exchange equilibrium is reached. The mixture now containing tritium-containing compounds passes from column 11 by means of line 13 and through radioactivity detector 14 by means of which the radioactivity of the tritium in the mixture is measured. The type of radioactivity detectors useful in the present invention are hereinafter discussed. By measuring the radioactivity of the mixture, the amount of tritium, which has a known amount of radioactivity per unit of weight, can be determined. By determining the amount of tritium passing from column 11, the concentration of the tritium-containing compounds, which initially were the compounds containing labile hydrogen, can be obtained. In practical usage the radioactivity response to detector 14 will most often be transmitted to a recorder 15 where it is continuously recorded in a desired form. The tritium-containing components pass from radioactivity detector 14 by means of line 16. The particular embodiment of the present invention illustrated by FIG. 1 is particularly useful wherein the analysis is either for the total concentration of labile-hydrogen-containing compounds in the mixture or for the detection and determination of the amount of a labile-hydrogen-containing compound in a mixture when only one of such compounds is present in said mixture. If two or more labile-hydrogen-containing compounds are present in the mixture and it is desired to detect and measure the amounts of each of these separately, the embodiment of the present invention described in relation to FIG. 2 is most often used.

Figure 2:
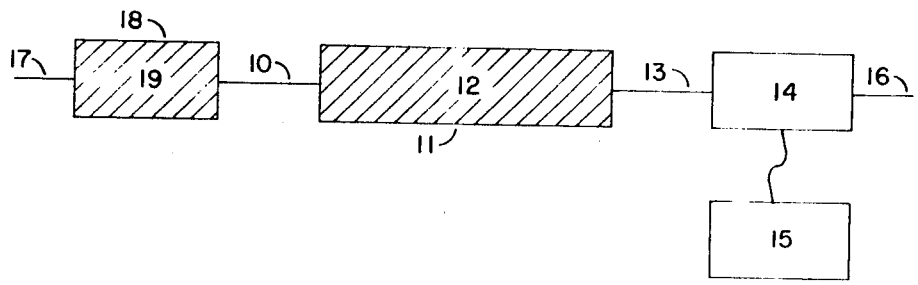

With particular reference to FIG. 2, a mixture containing two or more different compounds having labile hydrogen atoms is resolved into its components by introducing the mixture via line 17 into a separating column 18 in which means 19 are provided for separating the mixture into its components. Each component having labile hydrogen atoms then passes separately from any other compound having labile hydrogen atoms from separatory column 18 by means of line 10 into exchange column 11 wherein the labile hydrogen atoms are exchanged for tritium and the radioactivity of the resulting tritium-containing components subsequently detected and measured as described above in reference to FIG. 1.

Again, referring to FIG. 2, the means 19 provided in separating column 18 for resolving the mixture into its components include any means whereby the mixture may be separated into its components or at least the compounds containing labile-hydrogen atoms may be separated one from another. Such separation methods as selective adsorption, selective absorption or combinations of these are usually favored, though other techniques such as fractionation, diffusion through permeable membranes and the like may be used. The mixture may be separated in the vapor or the liquid state. As a practical matter, the separation means most often takes the form of a conventional chromatographic column operated according to conventional gas chromatographic techniques. In such gas chromatographic techniques, a long column, usually of ⅛ to 1 inch diameter and one to one hundred feet and more of length, is packed with a suitable fixed phase of material for separating the mixture to be separated. The mixture to be separated is generally vaporized, admixed with an inert carrier gas and introduced into the chromatographic column and passed over the fixed phase which selectively distributes the components of the mixture along its length. Those components of the mixture having least affinity for the fixed phase are swept from the chromatographic column first by the carrier gas followed by the other components in the order of their affinity for the substrate. Depending upon selection of the proper fixed phase and condition, efficient separation of mixtures is obtained by this technique.

Particularly useful as fixed phases in separating mixtures in separatory column 18 by conventional gas chromatographic techniques, are such selective absorbents as activated carbon, silica gel, alumina, silica-alumina, molecular sieves, etc., and such selective absorbents as dimethylformamide, dimethylsulfolane, diglycerols, polyglycols, etc., either supported or unsupported. When supported, the selective absorbent or absorbent used will depend, of course, upon the particular separation to be made and the conditions of temperature and pressure at which the separation is to be made. The considerations for determining the best materials for use in a given separation by conventional chromatographic techniques are well known and those skilled in the art will find no difficulty in determining the particular fixed phase best suited for separating a particular mixture in separating column 18, prior to passing the components of the mixture into exchange column 11.

Figure 3:
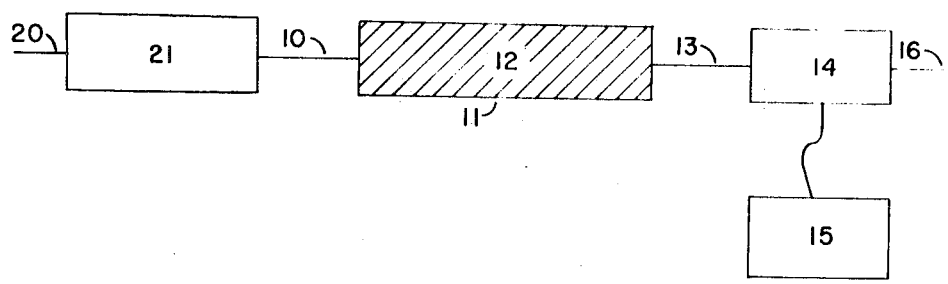

Referring now to FIG. 3, an embodiment of the present invention is presented which is particularly useful in the detection of compounds which do not contain labile hydrogen atoms but which compounds may be converted by chemical or physical means to compounds which do contain labile hydrogen atoms when such compounds are in admixture with other compounds. In this embodiment, the mixture is passed by means of line 20 into a conversion chamber 21. This conversion chamber may be of any type which will cause conversion of certain components of the mixture to compounds having labile hydrogen atoms, either by chemical or physical conversion means. The conversion chamber, of course, should be one which is sufficiently efficient to produce substantially quantitative or at least consistently reproducible conversion of those compounds which do not contain labile hydrogen atoms to compounds having labile hydrogen atoms. The resulting conversion products exit conversion chamber 21 and pass by means of line 10 into exchange column 11 and over substrate 12 by means of which the labile hydrogen atoms in the conversion products are exchanged for tritium and detected and measured as described above in reference to FIG. 1. If two or more compounds convertible to compounds having labile hydrogen atoms are present in the mixture or if compounds having labile hydrogen atoms and compounds convertible to compounds having labile hydrogen atoms are both present in the initial mixture, and detection and measurement of each of these compounds is desired, it is usually necessary to first resolve the mixture into its components as described in reference to FIG. 2 and then pass the components through conversion chamber 21 individually.

The means by which compounds which do not contain labile hydrogen atoms may be converted to other compounds which do contain labile or active hydrogen atoms may be any of the conventional conversion processes either chemical or physical, which will produce labile-hydrogen containing compounds from these compounds. The simplest and most useful of these methods, particularly when the convertible compound is a hydrocarbon, hydrogen or oxygen, is combustion, which produces water, which contains labile hydrogen as one of the combustion products. It is, of course, necessary for accurate determination that the combustion or conversion method be one which produces a quantitative conversion or at least a conversion of known and reproducible efficiency of the convertible compounds to compounds containing labile hydrogen atoms.

The present analytical method is based upon the exchangeability of labile hydrogen of compounds with tritium which is a radioactive-hydrogen isotope of mass number 3. When a labile-tritium-containing composition comes in contact with compounds containing labile hydrogen atoms, there is a rapid exchange of the labile hydrogen atoms with tritium atoms until an exchange equilibrium is reached. The radioactivity of the tritium is readily measurable while that of the labile hydrogen is not. However, the radioactivity of the tritium is not such as to produce a radiation hazard though the beta particles emitted from tritium may be detected with high sensitivity. The radiation of the tritium compounds may be measured by conventional means for measuring radioactivity, such as Geiger counters, proportional counters, scintillation counters, ion collection chambers, and the like. Preferably, for greater sensitivity, the radioactivity of the tritium compounds is measured by means of scintillation counters or ion collection chambers, usually the latter means being preferred over the former.

As noted above, when a labile-hydrogen-containing compound is brought into contact with a labile-tritium-containing source, there is a rapid exchange of the labile hydrogen atoms of the compound with labile tritium atoms until an exchange equilibrium is reached. Because of the exchange equilibrium, the exchange of labile hydrogen for tritium is usually not sufficiently quantitative to allow accurate determination of the amount of labile hydrogen initially present in the labile-hydrogen-containing compound unless at least a 5:1 molar ratio of tritium in the tritium source to labile hydrogen in the labile-hydrogen-containing compound is used. For best results and for a high degree of accuracy, it is usually desired to have a molar ratio of available tritium in the tritium source to labile hydrogen in the compounds to be exchanged of 10:1.

In the present analytical method, the source of the tritium is generally a tritium-containing fixed phase or substrate with which the labile-hydrogen-containing compounds are contacted. This tritium-containing substrate is conveniently prepared by merely bringing tritiated water into contact with a material possessing the characteristics of (1) a vapor pressure sufficiently low that it will not be vaporized to any significant extent under the conditions of the operation of the present analytical technique, (2) a high decomposition temperature such that there will be no decomposition during use, (3) containing labile-hydrogen atoms, (4) a structure relatively stable to the radiation emitted by tritium, and (5) having sufficiently large surface area to insure complete exchange. The contact between the tritiated water and the substrate results in the exchange of labile hydrogen of the substrate with the tritium of the tritiated water. The contacting of the tritiated water and the substrate may be accomplished as simply as merely mixing the two in a flask and then separating the excess materials and products. This method is not particularly recommended, however, since a vast excess of tritiated water or numerous successive contacting stages are necessary in order to obtain relatively complete exchange of the labile hydrogen of the substrate with tritium.

A second and a more preferred method of preparing the tritium containing substrate comprises placing the labile-hydrogen-containing substrate in a column, preferably the same column in which it will be used in the present analytical technique, and then passing vaporized tritiated water through the column until the labile hydrogen of the substrate has been exchanged with tritium to the fullest extent possible. In this latter preferred method of preparation of the tritium-containing substrate of the present invention, substantially all of the labile hydrogen of the substrate material may be exchanged for tritium.

In addition to the use of a tritium-containing substrate as above described, the labile hydrogen of the compound to be detected and measured may be exchanged for tritium by countercurrent or co-current contact with tritium-containing-compounds such as tritiated water. However, these types of contacting do not lend themselves well to analytical techniques because of physical problems of separating the compound to be detected from exchanged original tritium compounds and the like. Also, more complicated equipment would be necessary for such contacting. For these reasons, the present invention prefers the use of a fixed phase or substrate containing tritium, as above discussed.

As above noted, certain criteria must be met by the substrate materials from which the tritium-containing substrates of the present invention are obtained. They must be of sufficient high vapor pressure as not to be evaporated from the exchange column under the particular temperature and pressure conditions used. Also, the substrate material must be one which has a decomposition temperature such that the substrate will not decompose during contact with the mixture to be analyzed and it should not be readily decomposed by radiation. A further desirable characteristic of the substrate material is that it should be one which does not lose tritium other than by the exchange reaction with the compounds to be detected and measured. Some materials otherwise suitable for substrates for the exchange column in the present invention "leak" tritium both during contact with the mixture to be analyzed and during periods in which no mixture other than a carrier gas is in contact with the substrates. For example, when polyhydroxy compounds are used as a substrate, interaction between the molecules of the substrate will very often split out tritiated water which may continuously "leak" from the substrate. The leakage of this tritium both depletes the activity of the substrate and introduces error into the measurement and detection of the exchanged compounds in the mixture which is to be analyzed. Another necessary criteria for the substrate is that it be a compound which contains labile-hydrogen atoms. Among the substrate material suitable for preparing the tritium-containing substrates useful for detecting labile-hydrogen-containing compounds in accordance with the present invention are those having as substituents hydroxyl, amine, amide, or any other groups having labile hydrogen atoms attached thereto. Non-limiting examples of such compounds are relatively high-boiling alcohols, preferably the mono-hydroxy alcohols such as decanol, dodecanol and others; aromatic hydroxy compounds such as phenols, naphthols and the like; organic acids such as oxalic acid, dodecanoic acid, tridecanoic acid, sulfonic acid, etc.; inorganic hydroxides such as calcium hydroxide, sodium hydroxide, barium hydroxide; polymeric aromatic amines, polymeric aromatic amides, sulfonamides, etc.; benzimidazole polymers, polybenzothiazoles and the like. The preferred substrate materials are polybenzimidazoles or polymeric aromatic amides.

Although the tritium exchange substrate can be in the form of powder or a liquid-coated-solid as explained above, it has been found that an especially desirable tritium-exchange column is obtained when the substrate is fibrous in nature. The use of a fibrous substrate offers several distinct advantages over the use of a powder substrate or a coated substrate. The begin with, the fiber-packed columns do not pack under high carrier gas flow rates with the result the columns are not damaged by accidental pressure surges. Consequently, they maintain a much more uniform sensitivity over their useful life. Furthermore, since the fiber columns do not pack, their useful life is increased inasmuch as sensitivity remains constant over a much longer period of time, i.e., pressure drops do not increase with time. The fiber-packed columns also offer the advantage of faster frequency of analysis due to the fact that high carrier gas flow rates can be utilized. Another distinct advantage of fiber-packed columns arises from the face that they can be operated at lower temperatures than powder columns or coated columns with the result that thermal degradation of the substrate is greatly minimized. Also, the fiber-packed columns do not suffer from particle loss which occurs when minute pieces of a powdered substrate are transported by the carrier gas into the detector system resulting in high background and increased noise level and reducing the overall sensitivity of the system.

Obviously, the fiber-exchange columns require the use of a solid substrate in order to form the fibers. Substances suitable for forming the fibrous substrate include solid aromatic hydroxy compounds, inorganic hydroxides, polymeric aromatic amines, polymeric aromatic amides, polysulfonamides, polybenzothiazoles and polybenzimidazoles. Especially desirable for use as a fibrous substrate are the polymeric aromatic amides.

The materials which may be detected and quantitatively measured by the analytical technique of the present invention may be divided into two classes. The first class includes those compounds which contain labile- or active-hydrogen atoms. This includes water, alcohols, amines, amides, acids and the like. Several non-limiting examples of such compounds are water, methanol, ethanol, propanol, butanol, benzylamine formamide, acetamide, propanamide, acetic acid, formic acid, hydrogen chloride, hydrogen bromide, etc. The second class of materials detectable and measurable by the present invention include compounds and elements which do not contain labile or active hydrogen atoms and are thus not directly detectable or measurable, but which may by suitable conversion means produce compounds having labile or active hydrogen which are detectable or measurable. This latter class of compounds or elements includes particularly hydrocarbons, oxygen, hydrogen, the halogens, carbon dioxide and many other compounds which by chemical reaction with other elements or compounds yield labile-hydrogen-containing compounds. Hydrocarbons themselves do not contain labile hydrogen atoms, but may be quantitatively converted to $H_2O$ and $CO_2$ by combustion. Hydrogen may be converted to $H_2O$ in the presence of oxygen while oxygen may be converted to water by reduction in the presence of hydrogen. The $H_2O$ obtained then may be detected and measured by the process of the present invention. By detecting and measuring the amounts of water, the presence and amount of hydrocarbons, hydrogen or oxygen may be obtained along with, in the case of hydrocarbons, a reasonably accurate qualitative determination of the particular hydrocarbon. The qualitative determination of hydrocarbons, of course, must be based on the number of moles of water obtainable from combustion of particular hydrocarbons. The halogens may be determined by conversion to the corresponding hydrogen halides which then may be detected and measured in accordance with the present invention. Such compounds as carbon dioxide may be determined by reaction with such materials as calcium hydroxide which results in water as a by-product of the reaction. The water, of course, may be readily detected and measured by the present technique and is referable back to the carbon dioxide. Though compounds of virtually any molecular weight may be detected and measured by the present analytical method, it is most useful in the analysis of mixtures which are vaporizable at practical temperatures. Ordinarily, these mixtures are vaporizable at temperatures below 1000° C.

The analytical technique of the present invention is generally carried out with the mixture in a fluid state. Preferably, the mixture is passed into contact with the tritium-containing substrate in the gaseous state.

In practicing the present analytical technique by passing the mixture to be analyzed in a gaseous state over the tritium-containing substrate, a carrier gas is generally used to sweep the mixture sample into, through and out of the exchange column and through the radio-activity detector. Any of the conventional carrier gases used in gas chromatography may be used as a carrier in the present invention. Of course, the carrier gas used should be one which does not contain any labile hydrogen atoms. Among these are such carrier gases as hydrogen, helium, nitrogen, argon, carbon dioxide, methane, ethane, propane, butane, and the like. Preferably, nitrogen, helium, argon or ethane are used as carrier gases in practicing the present invention. Many of the carrier gases used for passing the mixture through the exchange column may also be used in carrying the mixture through a separatory column and/or a conversion chamber if used. Hydrocarbon carrier gases are, of course, usually avoided for carrying the mixture through an oxidation conversion chamber.

Though the present analytical techniques is useful in detecting and measuring any concentration of labile-hydrogen-containing compounds in mixtures, it is most useful in detecting and measuring concentrations of labile-hydrogen-containing compounds when they are present in mixtures in concentrations below those detectable and measurable by present gas chromatographic techniques. Also, the present invention is often quite useful in detecting and measuring compounds which though present in measurable quantities cannot be detected because of failure of present chromatographic techniques to adequately separate such compounds from a compound closely related in properties.

The operating conditions for the present analytical method may vary over a relatively wide range. Generally, temperature and pressure are adjusted in a manner to provide for flow through the exchange column and to maintain the mixture being analyzed in the vapor state. Usually the temperature of operation is within the range of from ambient temperatures (20 to 40° C.) to as high as 700° C. Pressures may range from subatmospheric pressure to as high as 100 p.s.i.g. and higher. Reduced pressures may be used in order to reduce the temperature necessary to maintain a vapor phase as well as to provide rapid flow of the mixture to be analyzed through the exchange column. The residence time of the mixture in the exchange column in contact with tritium-containing substrate may be very short. The exchange reaction between the tritium of the substrate and labile hydrogen of the compounds containing same is very rapid. Residence times of as low as 0.01 second have been found sufficient for a 99.9 percent complete exchange of tritium for labile hydrogen.

In the most useful embodiment of the present analytical technique, the exchange column is tubular in design having a non-adsorptive inner surface. When the present invention is used for analyzing for extremely small quantities of compounds containing labile hydrogen, adsorption of the components in the system by the exchange column inner surfaces may significantly reduce the sensitivity of the analytical technique. Thus, the inner surfaces of the exchange column should be non-adsorptive to the labile hydrogen or tritium-containing components of the system. A particularly useful material of construction of the exchange tube is pure platinum. In addition, other pure-heavy metals such as gold, silver, rhodium and iridium may be used in the exchange column. Polyhaloethylenes such as polytetrafluoroethylene and polychlorofluoroethylene have been found to be useful materials of construction for the exchange column. Also, polyolefins such as polyethylene, polypropylene and the like and polyimides are suitable for use in constructing the columns.

Adsorption of the tritium-containing compounds exiting the exchange column may also occur in the flow lines connecting the exchange column and the radioactivity detector as well as in the radioactivity detector itself. Again, when the amount of these adsorbable compounds in the system is extremely small, appreciable error may be introduced by this adsorption. The adsorption of the tritium-containing compounds may be alleviated by the use of non-adsorptive surfaces within the flow lines and the radioactivity detection chamber. However, a more useful and less expensive means of overcoming the adsorption of the tritium-containing compounds comprises introducing a labile-hydrogen-containing purge fluid in comparatively large quantities into the flow line between the exchange column and the radioactivity detector and more preferably into the effluent end of the exchange column. Dilution of the tritium-containing effluent from the exchange column with the large quantities of labile-hydrogen-containing purge fluid substantially reduces the amount of tritium-containing compound adsorbed since the labile-hydrogen containing material is adsorbed with equal facility with the tritium-containing effluent. The choice of the particular purge fluid may vary to some extent with reference to the particular tritium-containing compound. Preferably, it is one that is readily vaporizable such as, for example, methanol, ethanol, ammonia, methylamine or water. The quantity of purge fluid used is usually rather large with regard to the amount of tritium-containing compound in the effluent. The larger the amount of purge fluid, the less tritium-containing compound will be adsorbed.

To further assist in the understanding of the present invention, the following specific example of its operation is presented. This example is in no manner to be construed as limiting the present invention.

Example I

A tritium-containing substrate was prepared as follows:

A 308-milligram sample of a polybenzimidazole polymer of 80–100 mesh size particles prepared from diphenyl isophthalate and 3-3'-diaminobenzidene was packed into a length of 1/8" O.D. 0.005-inch wall thickness platinum tubing. This sample contained exchangeable hydrogen equivalent to one millimole of water. The platinum tubing was connected at its exit end to an ion chamber for the detection and measurement of radioactivity in the gases exiting the tubing. The ion chamber was in turn electrically connected to an electrometer having a $10^{12}$-ohm feedback resistor and a strip chart recorder in order that radioactivity detected by the ion chamber could be recorded and measured on a strip chart. Pre-dried ethane was then passed over the substrate at the rate of 100 ml./min. for 24 hours at 300° C. to remove traces of impurities and volatile materials from the substrate. The temperature of the substrate was then reduced to 175° C. and 36 milligrams (2.0 millimoles) of tritiated water having a specific activity of one curie per millimole was introduced into contact with the substrate at a constant rate over a 24-hour period. After the introduction of the tritiated water, the substrate was maintained at the temperature of 175° C. for an additional period of 24 hours under a mild ethane flow in order to allow the substrate to become stabilized.

The system sensitivity for labile-hydrogen detection and measurement was determined by injecting into contact with the substrate one micro liter of hexane containing 4 p.p.m. of water. The response of the ion chamber to the effluent from the substrate was then recorded on the strip chart, as a peak indicating 220 millivolts. The sensitivity was thus obtained as .0182 p.p.m. water per millivolt.

One micro liter of a hydrocarbon sample comprised of toluene and containing an estimated amount of water of less than 100 p.p.m. was vaporized and passed through the platinum tubing and over the tritium-containing polybenzimidazole substrate in admixture with pre-dried ethane as a carrier gas. The flow rate of the carrier gas was 100 ml./min. The temperature within the column was 175° C. A methanol purge gas was introduced into the effluent from the platinum exchange column at the rate of 10 ml./min. The effluent from the platinum column then passed into the ion chamber from which it was vented. Radioactivity of the effluent was measured during passage through the ion chamber and recorded on the strip chart of the recorder, as a peak indicating 3960 millivolts. The amount of water in the hydrocarbon sample, from the sensitivity of .0182 p.p.m./mv., was determined to be 72 p.p.m. which was the actual amount of water present.

Example II

A tritium-exchange column prepared by packing a platinum tube of 1/8" O.D. and 0.005" wall thickness with a powdered polymeric aromatic amide was used in a detection and measuring system exactly like that in Example I. Pre-dried propane was employed as a carrier gas at a flow rate of 100 cc. per minute. The column was operated at a temperature of 160° C. A 0.1 micro liter sample of benzene containing 80 p.p.m. water was injected into the system. The response of the ion chamber to the effluent from the powder-packed column was recorded on the strip chart. The peak obtained is shown at 22 in FIG. 4.

Example III

The procedure of Example II was followed except that the column consisted of a platinum tube packed with fibers of the polymeric aromatic amide used in Example II and the temperature of the column was reduced to 145° C. The response of the ion chamber to the effluent from the fiber-packed column was also recorded on the strip chart. The resulting peak is shown at 23 in FIG. 4.

Figure 4:
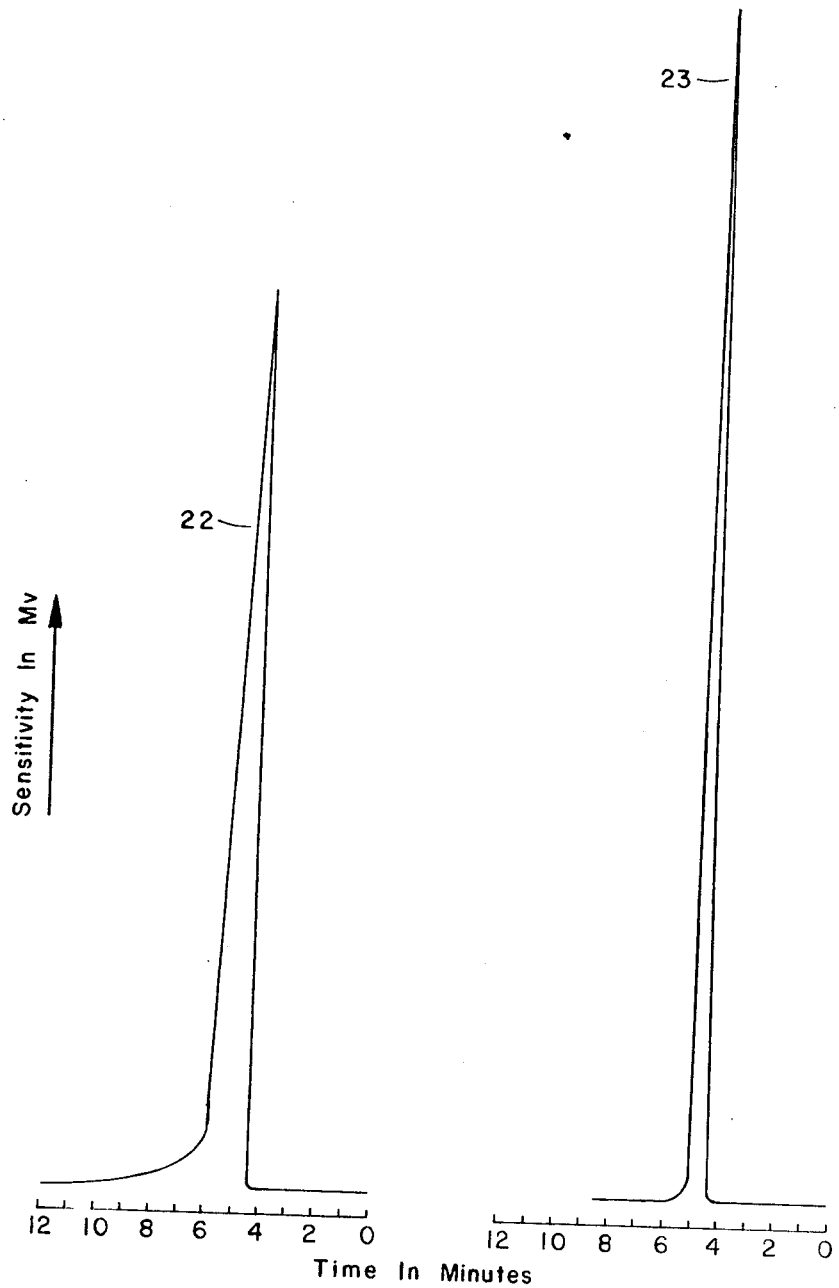
FIG. 4 is a comparison of recordings obtained using a powder-packed-tritium-exchange column and a fiber-packed-tritium-exchange column. In the drawings the same reference characters are used in each drawing to denote the same segments of the present invention.

As can readily be seen from a comparison of peaks 22 and 23 in FIG. 4, the use of fiber-packed columns gives greater sensitivity, much less peak broadening and consequent resolution of closely eluted compounds. Also, as can be noted from comparison of Examples II and III, the use of a fiber-packed column permits operation of the column at lower temperature with no loss of and indeed an actual increase in sensitivity. Furthermore, it was found that the powder-packed column of Example II after sustained use showed decreasing sensitivity and a steady background increase of about 100 chart divisions per week whereas the sensitivity obtained with the fiber-packed column remained almost constant and showed little or no increase in background.

What is claimed is:

1. An analytical method for the detection and measurement of labile-hydrogen-containing compounds which comprises:

passing a sample mixture containing at least one compound having labile hydrogen through a fixed phase of a labile-tritium-containing fibrous substrate whereby the labile hydrogen in said compound exchanges with the labile tritium in said substrate; and detecting and measuring the radioactivity of the resulting tritium-containing compound, said detection and measurement being directly referable to said labile-hydrogen-containing compound initially present in said sample mixture.

2. The method of claim 1 wherein the labile-hydrogen-containing compound is selected from the group consisting of water, alcohols, acids, amines and amides.

3. The method of claim 1 wherein said sample mixture is passed over said tritium-containing substrate while in the gaseous state.

4. The method of claim 1 wherein said sample mixture is separated into its components before being passed over said substrate and said components are then passed over the substrate individually.

5. The method of claim 1 wherein said substrate is one selected from the group consisting of high boiling alcohols, aromatic hydroxy compounds, organic acids, inorganic hydroxides, polymeric aromatic amines, polymeric aromatic amides, polysulfonamides, polybenzothiazoles and polybenzimidazoles.

6. The method of claim 5 wherein said substrate is a polymeric aromatic amide.

7. The method of claim 5 wherein said substrate is a polybenzimidazole.

8. An analytical method for the detection and measurement of components convertible to labile-hydrogen-containing compounds which comprises:
subjecting a sample mixture containing at least one component convertible to a labile-hydrogen-containing compound to a suitable conversion means;
passing the resulting labile-hydrogen-containing compound through a fixed phase of a labile-tritium-containing fibrous substrate, whereby the labile hydrogen of said resulting labile-hydrogen-containing compound exchanges with said labile tritium; and
detecting and measuring the radioactivity of the resulting tritium-containing compound, which detection and measurement is directly referable to said component, initially present in said mixture, convertible to said labile-hydrogen-containing compound.

9. The method of claim 8 wherein said component convertible to said labile-hydrogen-containing compound is one selected from the group consisting of hydrocarbons, hydrogen and oxygen.

10. The method of claim 8 wherein said sample mixture is passed over said labile-tritium-containing substrate while in the gaseous state.

11. The method of claim 8 wherein said sample mixture is separated into its respective components before being subjected to said conversion means.

12. The method of claim 8 wherein said substrate is one selected from the group consisting of high boiling alcohols, aromatic hydroxy compounds, organic acids, inorganic hydroxides, polymeric aromatic amines, polymeric aromatic amides, polysulfonamides, polybenzothiazoles and polybenzimidazoles.

13. The method of claim 12 wherein said substrate is a polymeric aromatic amide.

14. A fluid-solid column for use in the detection and measurement of labile-hydrogen-containing compounds and compounds convertible thereto comprising a suitable tube packed with fibers of a substrate having labile hydrogen atoms at least a portion of said hydrogen atoms having been replaced by tritium atoms.

15. The column of claim 14 wherein said substrate is selected from the group consisting of solid aromatic hydroxy compounds, inorganic hydroxides, polymeric aromatic amines, polymeric aromatic amides, polysulfonamides, polybenzothiazoles and polybenzimidazoles.

16. The column of claim 15 wherein said substrate is a polymeric aromatic amide.

17. The column of claim 16 wherein said tube is made of a material selected from the group consisting of gold, silver, platinum, rhodium, polyolefins, polyimides, polytetrafluoroethylene and polychlorofluoroethylene.

18. A system for the detection and measurement of compounds containing labile hydrogen which comprises in combination:
a suitable tube packed with fibers of a substrate having labile hydrogen atoms, at least a portion of said hydrogen atoms having been replaced by tritium atoms;
means to introduce a sample mixture into said tube, said sample mixture containing at least one compound having labile hydrogen;
means to introduce a fluid carrier stream into said tube, said carrier stream serving to transport said sample through said tube whereby the labile hydrogen in said compound exchanges with the tritium in said substrate;
means for withdrawing the sample and carrier fluid from said tube; and
means for detecting and measuring the radioactivity of the resulting tritium-containing compound.

19. System of claim 18 having a means for introducing an active hydrogen containing purge fluid into said means for withdrawing the sample and carrier fluid from said tube.

20. System of claim 18 having a means for introducing an active hydrogen containing purge fluid into the effluent end of said tube.

21. The system of claim 20 wherein said substrate is selected from the group consisting of solid aromatic hydroxy compounds, inorganic hydroxides, polymeric aromatic amines, polymeric aromatic amides, polysulfonamides, polybenzothiazoles and polybenzimidazoles.

22. The system of claim 21 wherein said substrate is a polymeric aromatic amide.

23. A fluid-solid column for use in the detection and measurement of labile-hydrogen-containing compounds and compounds convertible thereto comprising a suitable tube packed with a substrate having labile hydrogen atoms at least a portion of said hydrogen atoms having been replaced by tritium atoms.

24. The column of claim 23 wherein said substrate is selected from the group consisting of solid aromatic hydroxy compounds, inorganic hydroxides, polymeric aromatic amines, polymeric aromatic amides, polysulfonamides, polybenzothiazoles and polybenzimidazoles.

25. A system for the detection and measurement of compounds containing labile hydrogen which comprises in combination:
a suitable tube packed with a substrate having labile hydrogen atoms, at least a portion of said hydrogen atoms having been replaced by tritium atoms;
means to introduce a sample mixture into said tube, said sample mixture containing at least one compound having labile hydrogen;
means to introduce a fluid carrier stream into said tube, said carrier stream serving to transport said sample through said tube whereby the labile hydrogen in said compound exchanges with the tritium in said substrate;
means for withdrawing the sample and carrier fluid from said tube; and
means for detecting and measuring the radioactivity of the resulting tritium-containing compound.

26. The system of claim 25 wherein said substrate is selected from the group consisting of solid aromatic hydroxy compounds, inorganic hydroxides, polymeric aromatic amines, polymeric aromatic amides, polysulfonamides, polybenzothiazoles and polybenzimidazoles.

References Cited

Eastham, J. F. et al.: Analytical Chemistry, vol. 31, pp. 555–8 (1959).

MORRIS O. WOLK, Primary Examiner

E. A. KATZ, Assistant Examiner

U.S. Cl. X.R.

23—232 R, 253 R, 254 R, 232 C; 250—106 R, 106 T